United States Patent                                            [11] 3,621,011

[72] Inventors   Peter B. Russell
                 Villanova;
                 Harvey E. Alburn, West Chester; Norman
                 H. Grant, Wynnewood, all of Pa.
[21] Appl. No.   852,467
[22] Filed       Aug. 22, 1969
[45] Patented    Nov. 16, 1971
[73] Assignee    American Home Products Corporation
                 New York, N.Y.

[54] 6-(2-AMINO-HEXAHYDRO-2-
     INDANCARBOXYAMIDO) AND 6-
     (1,2,3,4,5,6,7,8,9,10-DECAHYDRONAPHTHALENE-
     2-AMINO-2-CARBOXAMIDO) PENICILLANIC
     ACIDS
     10 Claims, No Drawings
[52] U.S. Cl. ........................................................ 260/239.1,
                                                          424/271
[51] Int. Cl. ........................................................ C07d 99/16
[50] Field of Search ............................................ 260/239.1

[56]                    References Cited
                   UNITED STATES PATENTS
3,494,915   2/1970   Alburn et al. ................... 260/239.1

Primary Examiner—Nicholas S. Rizzo
Attorneys—Andrew Kafko, John Hagan and Edward A.
  Hedman ABSTRACT: The compounds are 6-(2-amino-hexahydro-2-indancarboxamido) penicillanic acids and 6-(1,2,3,4,5,6,7,8,9,10-decahydronaphthalene-2-amino-2-carboxamido) pencillanic acids, which have broad spectrum antimicrobial activity against both gram-positive and gram-negative strains of bacteria, including penicillin-resistant staphylococci. The compounds are also characterized by being relatively acid-resistant, thereby to be effective on oral administration, and by low water solubility which makes them useful in repository injectable dosage forms without the necessity for forming salts thereof with organic bases.

6-(2-AMINO-HEXAHYDRO-2-INDANCARBOXYAMIDO) AND 6-(1,2,3,4,5,6,7,8,9,10-DECAHYDRONAPHTHALENE-2-AMINO-2-CARBOXAMIDO) PENICILLANIC ACIDS

SUMMARY OF THE INVENTION

This invention relates to new synthetic penicillins having potent activity against both gram-negative and gram-positive micro-organisms, including penicillin-resistant staphylococci. The compounds are also characterized by being relatively acid-resistant, thereby to be effective on oral administration, and by low solubility, which makes them useful in repository injectable dosage forms without the necessity for forming salts thereof with organic bases.

The new synthetic penicillins of the present invention, when considered in their broadest aspects, include those compounds encompassed within the following structural formula:

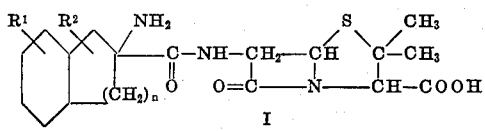

wherein $R^1$ and $R^2$ each may be selected from the group consisting of hydrogen, lower alkyl, lower alkoxy, aryl and aryloxy; and $n$ is an integer from 1 to 2.

The novel compounds of the invention may generally be prepared by reacting a suitable 4-substituted-2,5-oxazolidinedione (also known as an N-carboxy amino acid anhydride or NCA) with 6-aminopenicillanic acid (6-APA). Preferably, a solution of 6-APA and triethylamine is first prepared which is slightly acid (e.g., about pH 6). Thereafter the selected N-carboxy anhydride is added, and the reaction mixture stirred at a lowered temperature. The novel compounds of the invention, resulting from the reaction between 6-APA and the N-carboxy amino acid anhydride may then be recovered by conventional procedures such as filtration, concentration, water extraction and precipitation from organic solvents, as indicated.

The N-carboxy amino acid anhydrides suitable for preparing the new penicillins of formula I above when $n$ is 1; i.e., the 2-amino-hexahydro-indane-2-carboxylic acid NCA's, may be prepared by a synthesis which starts with the preparation, from a selected indane, of the corresponding 2-indanone by the method described by Rose, Dorfman and Linfield in the *Journal of Organic Chemistry* 29, 1973, 1964. The hydantoin of the 2-indanone may then be prepared by the generally known method for reacting the 2-indanone with ammonium carbonate and potassium cyanide in an organic solvent. The resulting 2-indanone hydantoin may then be transformed to the 2-aminoindane-2-carboxylic acid by ring splitting hydrolysis, as by heating in the presence of barium hydroxide. The benzenoid moiety of the amino acid may be reduced to the corresponding hexahydro moiety by hydrogenation of said acid in an inert solvent, such as water in the presence of rhodium on carbon as catalyst, at a temperature within the range of about 10° to 60° C., as is also known to those skilled in the art. The NCA of the resulting 2-amino-hexahydroindane-2-carboxylic acid may be prepared by the phosgenation of said acid. The N-carboxy amino acid anhydrides suitable for use in the preparation of the novel penicillanic acid compounds of this invention may also be prepared by other known procedures such as those referred to or described, for example, in U.S. Pat. No. 3,194,802 of H. E. Alburn, N. H. Grant and H. Fletcher, 3rd.

The N-carboxyanhydrides suitable for preparing the new penicillins of formula I wherein $n$ is 2; i.e., 1,2,3,4,5,6,7,8,9,10-decahydronaphthalene-2-amino-2-carboxylic acid NCA's, may be prepared by a general synthesis similar to that set forth above, with merely the substitution of a selected 1,2,3,4-tetrahydronaphthalene for the indane starting material of the first synthesis.

The foregoing general synthesis may be represented schematically as follows:

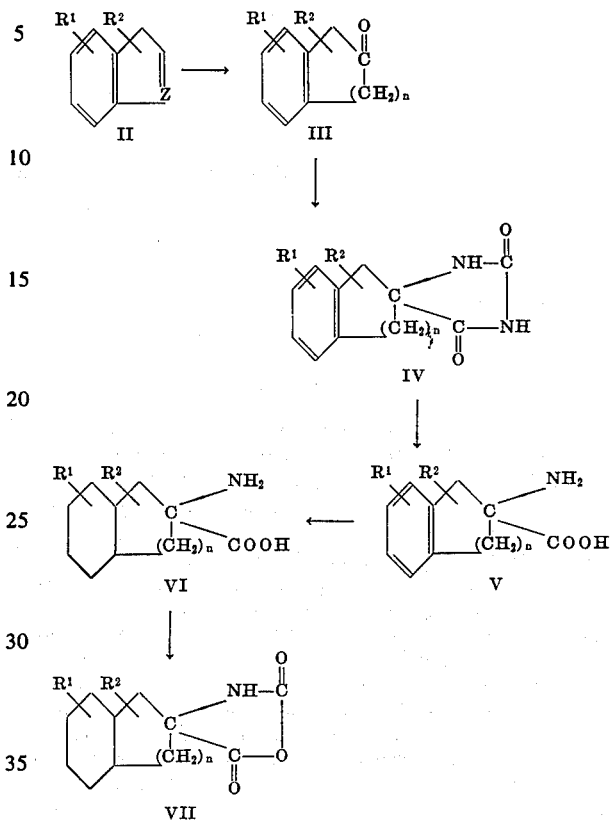

wherein $R^1$, $R^2$ and $n$, each has the same meaning as set forth with respect to formula I above, and Z is a trivalent hydrocarbon of the group consisting of:

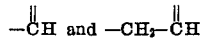

The new penicillin compounds of the series defined above show desirable broad spectrum antibacterial activity and are useful as therapeutic agents for poultry and mammals in the treatment of infectious diseases caused by gram-positive and gram-negative bacteria, and are of surprisingly good activity particularly with respect to penicillin-resistant strains of staphylococci, by either parenteral or oral administration. As parenteral antibiotics, they are particularly effective since, as referred to hereinbefore, they have low water solubility which makes them useful in repository injectable dosage forms, without the necessity of forming salts of the new penicillins, of formula I with organic bases. As also referred to hereinbefore, the new penicillins of formula I are effective on oral administration because they are relatively acid resistant.

The penicillin compounds of the invention, in addition to be advantageously utilizable in their acid form, as noted hereinbefore; may also be used in the form of the therapeutically active salts thereof, as will be understood by those skilled in the art. Merely by way of example, the latter salts may be the sodium or potassium salts, or hydrochloride, sulfate, fumarate, etc., or in the form of the pharmaceutically acceptable acid addition salts prepared by the reaction of the penicillin compounds with an amine or diamine base, e.g., procaine or various N-N'-disubstituted alkylene diamines, such as N,N'-dibenzylethylene-diamine, etc.

As will also be understood by those skilled in the art, the compounds of the invention may be utilized in suitable dosage forms, including solutions, suspensions, tablets, capsules, and the like, utilizing conventional solvents, suspensoids, excipients, and the like.

The following examples are illustrative of the invention, but are not to be considered necessarily limitative thereof:

Example 1

6-(2-Amino-hexahydro-2indancarboxamido) Penicillanic Acid

A. Preparation of 2-indanone

325 ml. of 99 percent formic acid, 43 ml. of water, and 70 ml. of 30 percent hydrogen peroxide were mixed and warmed to 35° C. over 15minutes. Freshly distilled indene (58.1 g.) was added over 2 hours while maintaining a temperature of 34°–36 C. with a cool water bath. The mixture was stirred an additional hour at 34°–36° C. and then overnight at room temperature.

10.6 g. of the heptahydrate of ferrous sulfate were added in 53 ml. of water to remove the active oxygen compounds and the solution was concentrated to 170 ml. in vacuo. A solution of 140 ml. of concentrated $H_2SO_4$ in 860 ml. of water was added and 200 ml. of distillate was steam distilled. The distillate was extracted with 3×100 ml. of methylene chloride. The extracts were combined and washed with 500 ml. of water, dried over $Na_2SO_4$, filtered, and evaporated to an oil which crystallized. MP 57°–59° C. 67 percent.

B. Preparation of 2-indanone hydantoin

2-Indanone, 22.5 g. (0.17 moles), ammonium carbonate monohydrate 48.5 g. (0.425 moles), and potassium cyanate 16.3 g. (0.25 moles) were mixed in 210 ml. of formamide and heated in a pressure bomb at 100° C. overnight. The cooled reaction was diluted with 600 ml. of water and acidified with concentrated HCl to a pH 2 with good ventilation. The precipitate was filtered, washed with water and dried. MP 255°–7a$L$ C. Yield: 46.5 g. wet. The material was purified by dissolving in 5 percent aqueous NaOH, extracting with ether, and acidifying. MP 260°–262° C.

C. Preparation of 2-aminoindane-2-carboxylic acid

2-Indanone hydantoin 55.75 g. (0.273 moles), barium hydroxide octahydrate 215 g. (0.658 moles) and 300 ml. of water were heated in a bomb at 200° C. for 20 hours. The pressure reached 250 p.s.i. The hydrolysis mixture was acidified with concentrated HCl to pH 2, heated to boiling, treated with Darco G–60 and filtered. 38 ml. of concentrated $H_2SO_4$, was added to the filtrate with stirring and the slurry was heated and filtered. The Ba $SO_4$ precipitate was washed with hot water and the combined filtrates were evaporated to dryness. The residue was dissolved in 100 ml. of water and adjusted to pH 4.5 with aqueous NaOh and chilled. The product was dried. A second crop was obtained by concentrating the mother liquer.

| Yield: | | | |
|---|---|---|---|
| 1st crop | 12.2 g. | m.p. 309°–311° C. | |
| 2nd crop | 3.8 g. | m.p. 291°–293° C. | |
| Total | 16.0 g. | 33% | |

D. Preparation of 2-amino-hexanhydroindane-2-carboxylic acid

Hydrogenation of the 2-aminoindane-2-carboxylic acid was carried out by utilizing 17.7 g. of the amino acid, 8 ml. of concentrated HC1, and 2 g. of 5 percent rhodium on charcoal in 150 ml. of water in the Parr bomb, first at room temperature and then at 50°. The system was filtered, and the filtrate was adjusted to pH 5.5 with NaOH. Crystals appeared after chilling. Yield: 12 g.

Calcd for $C_{10}H_{17}NO_2$: C, 65.54; H, 9.35; N, 7.64
Found: C, 64.56; H, 9.36; N, 7.68

E. Preparation of N-carboxy-2-amino-hexahydroindane-2-carboxylic acid anhydride.

N-carboxy-2-amino-hexahydroindane-2carboxylic acid anhydride was prepared by treating 10 g. of the amino acid prepared in D. above, in 500 ml. of dioxane with phosgene at 90° for 2½ hours. The clear solution was flushed with dry $N_2$ and evaporated to a semisolid. This was dissolved in 75 ml. of warm ethyl acetate and crystallized by adding 75–100 ml. of hexane and chilling to 0°. Yield: 6.5 g.

Calcd for $C_{11}H_{15}NO_3$: C, 63,13; H, 7.22; N, 6.69
Found: C, 63.20; H, 7.15; N, 6.67

F. Preparation of 6-(2-amino-hexahydro-2-indancarboxamido penicillanic acid.

A suspension of 5 g. of 6–APA in 50 ml. of water was adjusted to pH 6.2 with triethylamine. There was then added 4 g. of N-carboxy-2-amino-hexahydro-2-indancarboxylic acid anhydride, and the resulting suspension was stirred at 4° for 5 days. The suspension was filtered, and the collected material was washed with water, suspended in 150 ml. of ethyl acetate, and stirred at room temperature for 20 minutes. The insoluble material was collected by filtration, washed with ethyl acetate, and suspended in 100 ml. of water. After adjustment to pH 6.3 with triethylamine, the product was collected, washed with water, and dried. The yield was 5.3 g.

Analysis: calculated for:
$C_{18}H_{27}N_3O_4S \cdot H_2O$: C, 51.7; H, 7.43; N, 10.0; $H_2O$, 8.6
Found: C, 51.7; H, 7.15; N, 9.99; $H_2O$, 8.1

EXAMPLE 2

6-(2-Amino-hexahydro-2-indancarboxamido) Penicillanic Acid

A mixture of 20 g. of 6-APA and 250 ml. of water was adjusted to pH 6.0 with triethylamine. After chilling to 4°, there was added 16 g. of N-carboxy-2-amino-hexahydro-2-indancarboxylic acid anhydride prepared as in example 1, and stirring was carried out for 5 days. The suspension was filtered, and the precipitate was washed with 350 ml. of water and then dried under vacuum. The infrared spectrum revealed the presence of residual N-carboxyanhydride; therefore, the product was washed by suspension in 500 ml. of ethyl acetate. The product was washed again with 400 ml. of water and was then filtered and dried giving 16.9 g.

Analysis:
Found: C, 51.7; H, 7.16; N, 10.2; $H_2O$, 8.39

EXAMPLE 3

6-(2-amino-hexahydro2-indancarboxamido)penicillanic acid was demonstrated to be superior to its aromatic analog, 6-(2-amino-2-indancarboxamido)penicillanic acid, when tested by standard testing procedures against a series of organisms, with the results set forth in the following table A:

TABLE A

| | Minimal inhibitory concentration, μg./ml. | |
|---|---|---|
| Test organism | 6-(2-amino-2-indancarboxamido)penicillanic acid | 6-(2-amino-hexahydro-2-indancarboxamido)penicillanic acid |
| Bacillus subtilis, 6633 | 1.95 | 0.244 |
| Staphylococcus aureus, 6538P | .976 | 0.488 |
| Staphylococcus aureus, Smith | .976 | 0.488 |
| Staphylococus aureus, CHP | 7.81 | 15.6 |
| Staphylococus aureus, 53–180 | 31.3 | 7.81 |
| Neisseria catarrhalis, 8193 | 7.81 | 1.95 |
| Escherichia coli, 6880 | 250 | 3.90 |
| Escherichia intermedia, 65–1 | NA | 125 |
| Salmonella paratyphi, 11737 | 31.3 | 15.6 |
| Enterobacter aerogenes, 884 | 7.81 | 0.488 |
| Klebsiella, 10031 | NA | 125 |
| Proteus vulgaris, 6896 | 250 | 125 |
| Herellea sp., 9955 | 125 | 250 |

NOTE.—Range tested: .0009–250 μg./ml.

EXAMPLE 4

Following the procedure of example 1, a series of N-carboxy amino acid anhydrides are prepared, and the latter, as given in table B below, are respectively reacted with 6-APA to obtain the respective penicillin products also given in the table.

TABLE B

| N-carboxy amino acid anhydride | Penicillanic acid product |
|---|---|
| 2-amino-4-butyl-1,2,3,4,5,6,7,8-hexahydro-2-indancarboxylic acid N-carboxyanhydride. | 6-(1,2,3,4,5,6,7,8-hexahydro-indan-2-amino-4-butyl-2-carboxamido)-penicillanic acid. |
| 2-amino-3-phenoxy-1,2,3,4,5,6,7,8-hexahydro-2-indancarboxylic acid N-carboxyanhydride. | 6-(1,2,3,4,5,6,7,8-hexahydro-indan-2-amino-3-phenoxy-2-carboxamido)penicillanic acid. |
| 2-amino-4-phenyl-1,2,3,4,5,6,7,8-hexahydro-2-indancarboxylic acid N-carboxyanhydride. | 6-(1,2,3,4,5,6,7,8-hexahydro-indan-2-amino-4-phenyl-2-carboxamido)penicillanic acid. |
| 2-amino-1,2,3,4,5,6,7,8,9,10-decahydro-3,6-dimethyl-2-naphthoic acid N-carboxyanhydride. | 6-(2-amino-1,2,3,4,5,6,7,8,9,10-decahydro-3,6-dimethyl-2-naphthamido)penicillanic acid. |
| 2-amino-1,2,3,4,5,6,7,8,9,10-decahydro-7-ethoxy-2-naphthoic acid N-carboxyanhydride. | 6-(2-amino-1,2,3,4,5,6,7,8,9,10-decahydro-7-ethoxy-2-naphthamido)penicillanic acid. |
| 2-amino-1,2,3,4,5,6,7,8,9,10-decahydro-6-methoxy-2-naphthoic acid N-carboxyanhydride. | 6-(2-amino-1,2,3,4,5,6,7,8,9,10-decahydro-6-methoxy-2-naphthamido)penicillanic acid. |

We claim:

1. A compound having the formula:

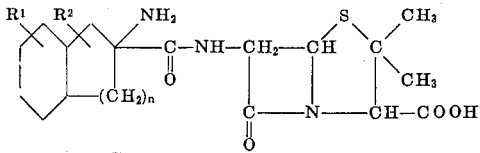

wherein $R^1$ and $R^2$ are each selected from the group consisting of hydrogen, lower alkyl, lower alkoxy, phenyl and phenoxy; and $n$ is an integer from 1 to 2 2.

2. A compound as defined in claim 1, wherein $n$ is 1.

3. A compound as defined in claim 2, which compound is:
6-(2-amino-hexahydro-2-indancarboxamido)penicillanic acid.

4. A compound as defined in claim 2, which compound is:
6-(1,2,3,4,5,6,7,8-hexahydro-indan-2-amino-4-butyl-2-carboxamido)penicillanic acid.

5. A compound as defined in claim 2, which compound is:
6-(1,2,3,4,5,6,7,8-hexahydro-indan-2-amino-3-phenoxy-2-carboxamido)penicillanic acid.

6. A compound as defined in claim 2, which compound is:
6-(1,2,3,4,5,6,7,8-hexahydro-indan-2-amino-4-phenyl-2-carboxamido)penicillanic acid.

7. A compound as defined in claim 1, wherein $n$ is 2.

8. A compound as defined in claim 7, which compound is:
6-(2-amino-1,2,3,4,5,6,7,8,9,10-decahydro-3,6-dimethyl-2-naphthamido)penicillanic acid.

9. A compound as defined in claim 7, which compound is:
6-(2-amino-1,2,3,4,5,6,7,8,9,10-decahydro-7-ethoxy-2-naphthamido)penicillanic acid.

10. A compound as defined in claim 7, which compound is:
6-(2-amino-1,2,3,4,5,6,7,8,9,10-decahydro-6-methoxy-2-naphthamido)penicillanic acid.

* * * * *